Figure 3:
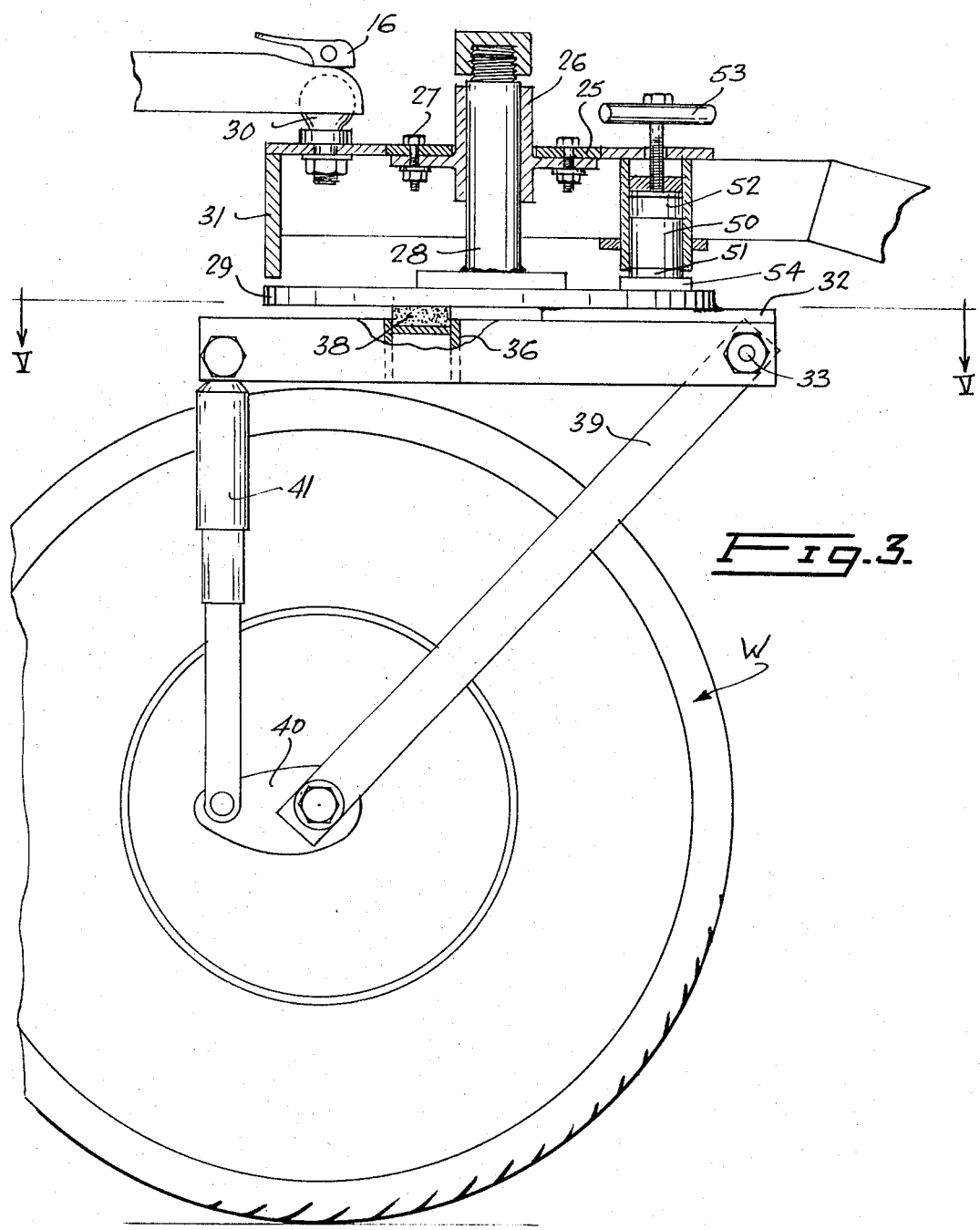

United States Patent [19]
Mitchell et al.

[11] 3,865,405
[45] Feb. 11, 1975

[54] TRAILER DOLLY

[76] Inventors: Stanley W. Mitchell, 1820 Huron Church Rd.; Edward N. Spenchuk, 1006 Brock St., both of Windsor, Ontario, Canada

[22] Filed: Oct. 17, 1973

[21] Appl. No.: 407,198

[52] U.S. Cl............................................ 280/476 R
[51] Int. Cl............................................. B60d 1/14
[58] Field of Search........ 280/405 R, 406 R, 406 A, 280/476, 495, 498, 501, 150 A, 446 B

[56] References Cited
UNITED STATES PATENTS

| | | | |
|---|---|---|---|
| 2,325,822 | 8/1943 | Whitmer.......................... | 280/476 R |
| 2,447,659 | 8/1948 | McDaniel..................... | 280/446 B X |
| 2,460,466 | 2/1949 | Nogle.............................. | 280/476 R |
| 2,570,482 | 10/1951 | Pruitt............................... | 280/476 R |
| 2,600,959 | 6/1952 | Bender............................ | 280/498 |
| 2,622,891 | 12/1952 | Knapp............................ | 280/476 R |
| 2,635,892 | 4/1953 | Shutter........................... | 280/432 X |
| 3,281,161 | 10/1966 | Anderson........................ | 280/476 R |

Primary Examiner—Leo Friaglia
Assistant Examiner—R. Schrecengost
Attorney, Agent, or Firm—Berman, Bishoff & Platt

[57] ABSTRACT

A trailer dolly is described for supporting the tongue-weight of a travel trailer while being towed. The dolly comprises a central frame member; a towing ball mounted on the frame member for receiving a trailer draft tongue universal coupling; and a road engaging wheel assembly swivelly connected via a vertical axis beneath the frame member, said wheel assembly including a pair of inclined fork members pivotally connected at their upper ends to a bridge member, a pair of shock absorbers mounted substantially vertically between the bridge member and the lower ends of the fork members and a road engaging wheel journaled in the lower ends of the fork members. Rigid hitch members extending forwardly and outwardly from the central frame member and have at their forward ends connector means for connecting to the frame of a towing vehicle by means of horizontal pivots. The dolly provides improved handling characteristics with a minimum of sway and pitching.

10 Claims, 8 Drawing Figures

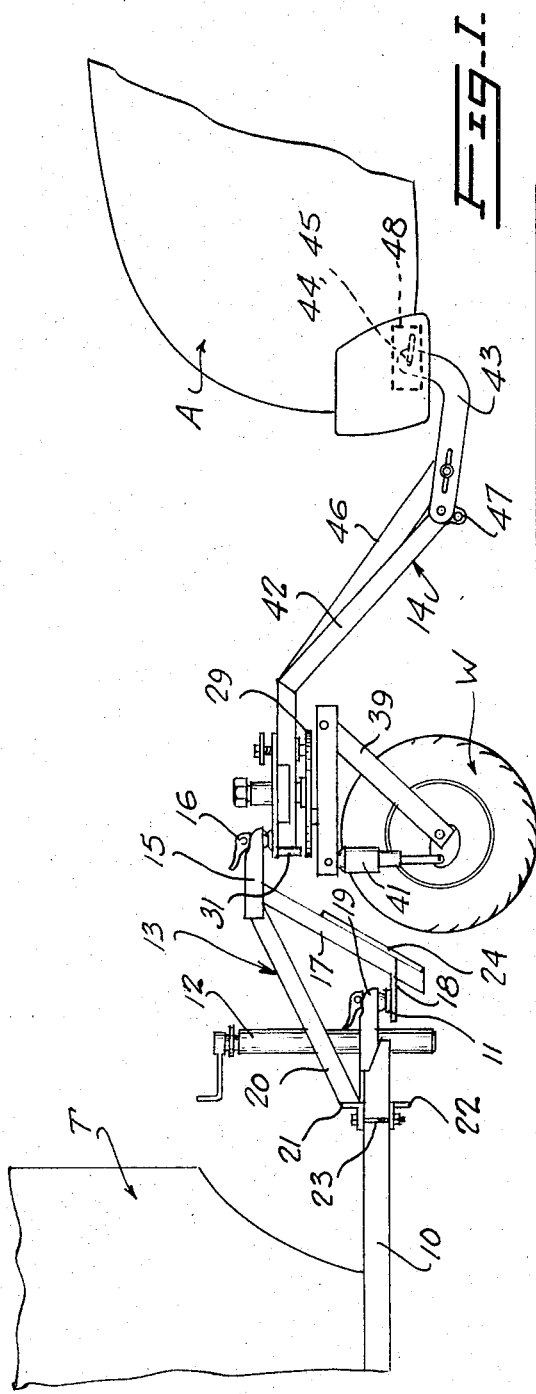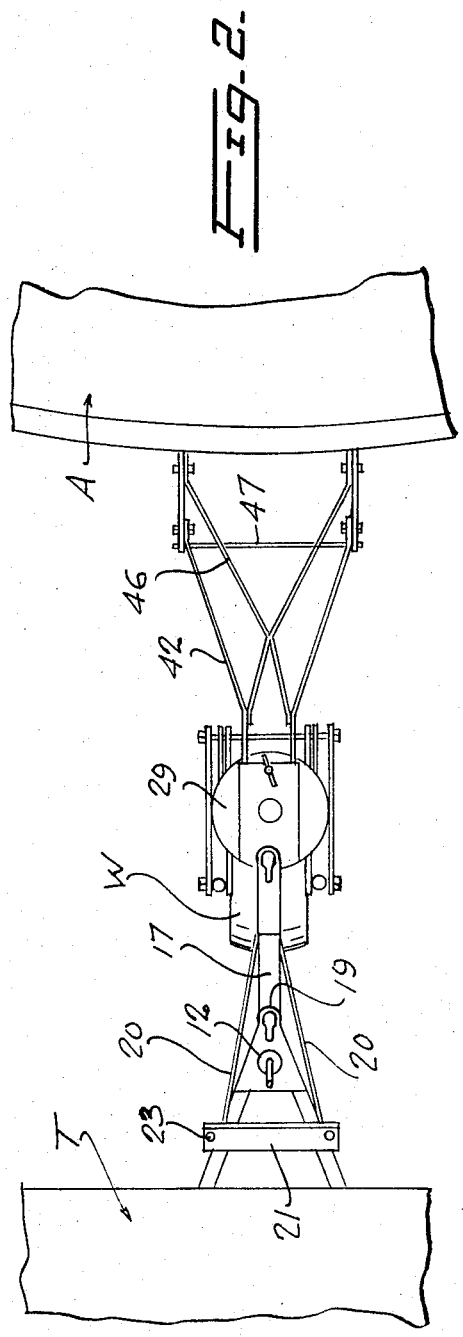

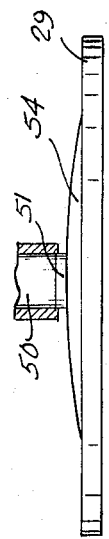
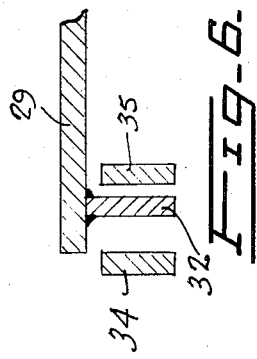
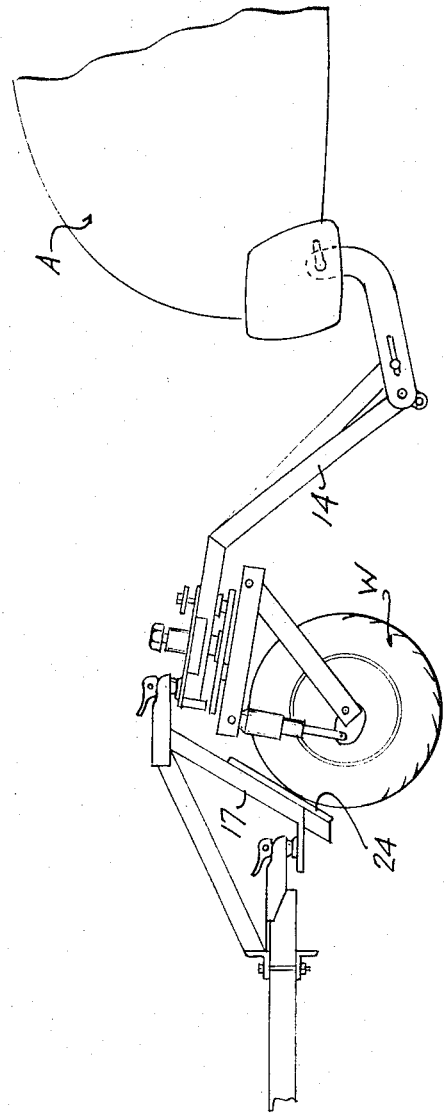

TRAILER DOLLY

BACKGROUND OF THE INVENTION

1. Field of the Invention

This invention relates to dollies for supporting the tongue-weight of travel trailers while travelling.

2. Description of the Prior Art

Trailer dollies have long been known that carry practically all of the weight of the front end of the trailer. Trailers of the travel trailer class tend to be quite heavy in tongue-weight and this puts a great load on the tail end of the towing vehicle. This becomes a considerable problem for modern automobiles and there has been a great tendency in recent years to use special towing vehicles.

The use of a dolly is an obvious one in terms of overcoming the problems of tongue-weight but tongue-weight is only one of a number of interrelated factors to be considered in the towing of travel trailers, particularly at highway speeds. One of the most serious difficulties that has been encountered with dollies has been that because of uneven road conditions and/or wind conditions there have tended to be very serious pitching movement and sway of the trailer. This puts a severe strain on the actual connection to the towing vehicle and also interferes with control of the towing vehicle.

One form of prior trailer dolly is described in Nogle, U.S. Pat. No. 2,460,466. The Nogle dolly has two swivel wheels mounted on a frame and the frame is fixed to a car bumper at two laterally spaced locations. However, it is no longer satisfactory to connect trailer hitches to car bumpers and it has been our experience that swivel wheels mounted in the manner shown by Nogle have difficulties in terms of swivel wheel wobble as well as pitching movement and sway of the trailer.

Because of these difficulties that have been encountered with dollies, the trailer industry has favoured a direct connection between the trailer tongue and towing vehicle even though this places a very heavy load on the rear end of the towing vehicle. This heavy load on the rear end, of course, tends to lighten the front end of the vehicle, resulting in an unbalanced condition, with a tendency for the front wheels of the vehicle to lose adequate traction, with consequent poor steering and braking control. To overcome this difficulty various load leveling or equalizing devices have been developed for transferring part of the load of the trailer tongue to the front wheels of the towing vehicle.

Towing over rough and winding roads often produces a tendency for the trailer to sway back and forth. A similar effect is also produced by the air pressure of passing vehicles at high speeds. Anti-sway devices have been developed to reduce this tendency to sway.

These difficulties with a direct connection between the trailer tongue and towing vehicle are also encountered when a dolly is used and particularly the problems of sway can even be amplified with the dolly because of dolly wheel wobble. In other words, in designing a trailer dolly, it is not merely a matter of placing the trailer tongueweight on some kind of a wheel supported assembly. This wheel assembly must not only carry the tongue-weight of the trailer but also avoid any difficulties as to pitching and sway of the trailer so that the towing vehicle can exercise a straight pulling action on the trailer without any interference to the handling characteristics of the towing vehicle even at high road speeds.

It is the object of the present invention to provide a trailer dolly meeting the above requirement.

SUMMARY OF THE INVENTION

The trailer dolly of this invention comprises a central support frame member having a towing ball mounted thereon for receiving a trailer draft tongue universal coupling. A road engaging wheel assembly is swivelly connected by way of a vertical axis beneath the frame member and this wheel assembly includes a pair of inclined fork members pivotally connected at their upper ends to a bridge member. A pair of shock absorbers are mounted substantially vertically between the bridge member and the lower ends of the form members and the road engaging wheel is also journaled in the lower ends of the fork members. Frame members in a generally wishbone configuration extend forwardly and outwardly from the central frame member and these frame members have at their forward ends connector means for connecting to the frame of a towing vehicle at a location beneath the vehicle body by means of horizontal pivots.

With the arrangement of this invention it will be seen that the trailer dolly cannot move laterally with respect to the towing vehicle and can only move vertically so that in terms of steering the trailer, the dolly in effect becomes an extension of the towing vehicle body. A damper arrangement is provided between the central frame member and the wheel assembly to prevent wobble of the wheel assembly and this anti-wobble damper combined with the fixed lateral connection between the dolly and towing vehicle is effective in controlling sway of the trailer.

Another difficulty that had to be resolved with the dolly of this invention was a problem of pitching movement at the forward end of the trailer tongue. This pitching was overcome by the particular combination of the articulated fork members and the vertically mounted shock absorbers in combination with the pneumatic tire of the road engaging wheel. It is also found advisable to provide a resilient pad, e.g. a rubber pad between the central frame and the wheel assembly to absorb very small road shocks. In other words, once the weight of the trailer tongue was placed on a dolly rather than on the rear end of the towing vehicle, all of these damping effects had to be absorbed entirely by the dolly itself and it was no longer possible to depend upon the suspension system of the towing vehicle to achieve this purpose. In order to achieve these results a very special kind of suspension was required in the dolly and the most effective one was found to be the combination of rubber pads, pivotally mounted forks and shock absorbers.

It is desirable to use a wheel of substantial diameter for the dolly. Preferably an automotive wheel having at least a ten or twelve inch rim is used and this means that the towing ball mounted on the frame of the dolly is a substantial distance above the ground. This has necessitated a simple upwardly inclined extension to the standard trailer tongue with a universal coupling so that the trailer hitch can be coupled to a towing ball on the dolly while still maintaining the trailer in its normal horizontal position.

An acceptable trailer dolly, such as the one of this invention, also has very important advantages because of the design of recent automobiles and the new designs of the next few years. Thus, in past years the automobiles used for towing trailers were generally rather similar in construction and there was a universal trailer hitch which could be connected to the automobile with relative ease. This was particularly valuable for the rental of trailers where the vehicle owner did not wish to own a trailer hitch. However, in the last few years there have been so many changes in the design of automobiles and the suspensions, sizes, arrangements, etc., vary so widely that it has become totally unrealistic to think anymore in terms of having a universal hitch for connecting to automobiles. It has now become necessary to in effect custom build a hitch for each individual automobile that is to be used for towing a trailer. The result of this is that it is no longer economical to rent a travel trailer for a short vacation period because of the costs of having a hitch adapted and connected to the towing automobile. Much of this difficulty was due to the fact that the hitch had to be able to carry the entire weight of the trailer tongue as well as being able to withstand the pitching, swaying, etc., of the trailer and this required a very strong connection to the towing vehicle.

With the dolly of this invention, the forwardly extending arms of the dolly can be connected beneath the body of a towing automobile to a pair of small brackets connected to the frame. These brackets need only be able to withstand a pulling motion and do not have to contend with severe swaying or pitching or the weight of the trailer. Also by connecting to the frame of the automobile beneath the automobile in this manner, any difficulties are avoided with respect to the very complex shock absorbing bumpers which are now becoming mandatory on new North American automobiles. Many of these shock absorbing bumpers are very complex in design as well as protruding a considerable distance beyond the automobile body and these seriously interfere with the usual hitches now in use for direct connection to a trailer tongue.

Figure 4:
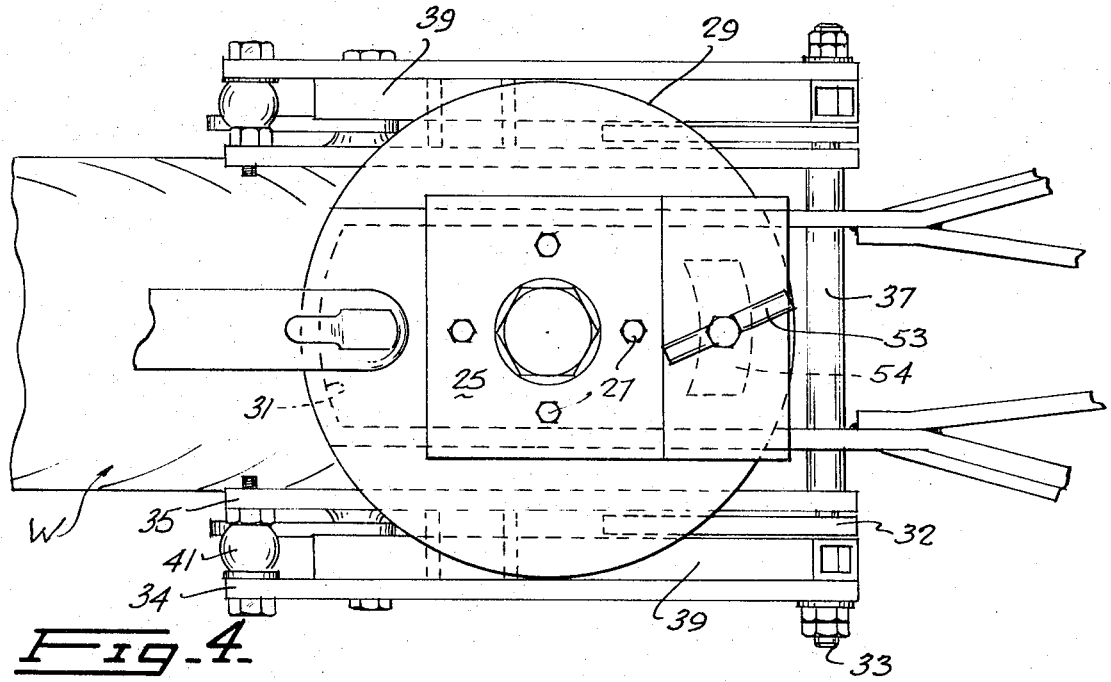
Figure 5:
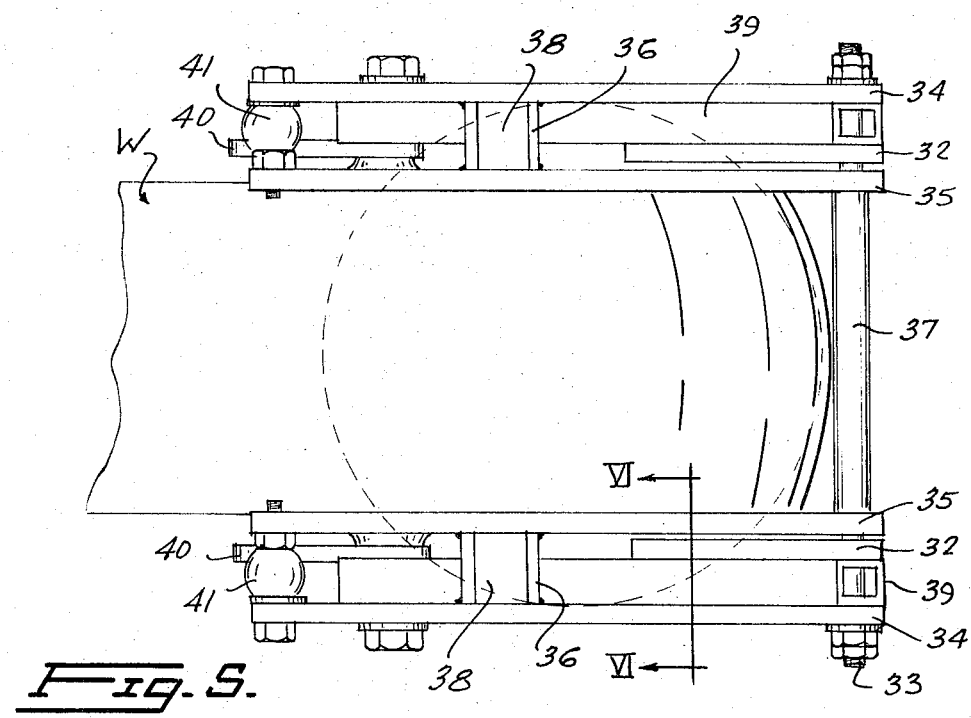

Other features and advantages of the invention will appear from the following description, taken in connection with the appended drawings in which:

FIG. 1 is a side elevation of an assembled dolly;
FIG. 2 is a top plan view of the assembly of FIG. 1;
FIG. 3 is a top plan view showing details of the wheel support;
FIG. 4 is a side elevation of FIG. 3;
FIG. 5 is a top plan view showing further wheel support details;
FIG. 6 is a detailed section view along line VI—VI;
FIG. 7 is a detailed view of an anti-wobble cam device, and
FIG. 8 is a side elevation showing the position of the wheel during a rapid stop.

As will be seen from FIG. 1, the dolly is used for coupling a travel trailer T to an automobile A. The trailer has a standard rigid forwardly extending draft tongue 10 with a universal coupling 19 and the usual support jack 12. The dolly as illustrated includes a trailer tongue extension 13 and an automobile connected dolly 14.

Looking first at the trailer tongue extension it will be seen that this includes a U-shaped extension 15 with a universal coupling 16. Extending downwardly and rearwardly from member 15 is a tubular member 17, to the bottom of which is welded a steel plate 18. This plate 18 has connected thereto a towing ball 11 which receives the universal coupler 19 of the standard trailer tongue. A heavy steel plate about 6 inches wide is fixed to a portion of member 17 adjacent wheel W and serves as a mud guard as well as a tire engaging abutment during rapid stops, as will be described more fully hereinafter. Extending outwardly and rearwardly from the rear end of member 15 are a pair of steel braces 20 which connect at their rear ends to an angle plate 21 which rests on the top of the trailer tongue. Beneath the trailer tongue is positioned a second angle plate 22 and bolts 23 interconnect the two angle plates firmly clamping the trailer tongue therebetween. These clamp angle plates together with the coupling 19 and ball 11 very rigidly secure the extension 13 to the standard trailer tongue.

Details of the dolly itself can best be seen from FIGS. 3 and 4 and it will be seen that this has an upper main U-shaped section 25. Mounted within a hole in this U-shaped section is a bearing mount 26 and this is held in position by way of bolts and nuts 27. At the rear end of U-shaped section 25 is mounted a towing ball 30 for receiving the universal coupling 16.

A vertically mounted automotive-type spindle 28 extends through bearing mount 26 and this spindle connects to a wheel assembly positioned beneath the U-section. The lower end of spindle 28 is fixed to a thick circular steel plate 29 which is in turn supported on a pair of steel suport plates 32 which are pivotally mounted at their forward ends on a bolt 33. Also pivotally mounted to bolt 33 are two pairs of laterally spaced longitudinal support members, each pair consisting of an outer longitudinal steel plate 34 and an inner longitudinal steel plate 35. Each pair of plates 34 and 35 includes a cross connecting bar 36 welded therebetween. The two support pairs 34, 35 are then held in spaced relationship by means of a cylindrical spacer member 37 connecting them at their forward ends and also surrounding the bolt 33 thereby providing a pivotal support. As has been indicated above, the circular plate 29 is pivotally mounted on the bolt 33 at the forward end and the rearward end of plate 29 is supported on the longitudinal assemblies 34, 35 with intervening rubber pads 38. The forks of the wheel assembly include tubular steel members 39 pivotally connected at their upper ends to bolt 33 and supporting the wheel W at their lower end. The lower ends of forks 39 also include brackets 40 and a spring loaded shock absorber, e.g. a Honda "350" motorcycle shock is mounted substantially vertically between bracket 40 and the rearward end of the longitudinal support member 34, 35.

The wheel itself is preferably of an automobile type and a highly satisfactory arrangement is a radial automotive tire mounted on a 12 inch rim. An even larger rim could be used if desired but it is preferable not to use a rim of less than about 10 inches in diameter.

To prevent bending of spindle 28 or other damage by extreme bending of the U-shaped section 25 relative to the wheel assembly, a protective plate 31 is mounted beneath section 25 at the rearward end thereof. This plate 31 has a curvature corresponding to the curvature of plate 29 and extends downwardly near plate 29. A gap of about one-sixteenth inch is left so that under normal travel conditions the circular plate 29 turns freely relative to plate 31. They come into contact with each other only under exceptional conditions, e.g.

while travelling on very rough terrain or when manoeuvring or parking the trailer.

In order to prevent wheel wobble, a nutation damper is mounted in U-section 25. This damper is in the form of a spring loaded cylinder 50 which extends vertically through U-section 25 and engages the top surface of plate 29. The contacting surface of cylinder 50 is in the form of a brass pad 51. Pressure is applied to the pad by spring 52 and the pressure can be adjusted by set screw 53. This pressure on plate 29, which swivels with the wheel, prevents free swivelling of the wheel and thereby prevents wobble. Preferably the brass pad engages a cam surface on the plate while functioning as a damper. This cam surface is in the form of a projection 54 on the top face of plate 29. As can best be seen from FIG. 7, the projection 54 has a flat central portion merging into a pair of gently curving inclined faces. The position shown in FIG. 7 is for normal straight ahead travel. As the dolly wheel commences to turn laterally, the pad 51 commences to travel down one of the inclined faces, thereby reducing the load on pad 51. When pad 51 is no longer in contact with cam 54 there is no interference from the damper with difficult manoeuvres such as backing the trailer into an awkward position.

The dolly is connected to an automobile by way of rigid steel bars 42 which extend outwardly and downwardly in a wishbone configuration from the forward end of U-member 25. The forward ends of bars 42 have connector members 43 which turn upwardly. The upwardly turned portions of members 43 contain universal eye connectors 44 for receiving pins 45 connecting these to automobile connector brackets 48. The members 42 are further reinforced by means of a reinforcing web 46 and a spacer bar 47 extending across between the connectors 43.

The brackets 48 can be simple U-brackets welded directly to the automobile frame, or depending on the automobile design extensions may be necessary for a proper connection. Regardless of the manner of connection, all of the components mounted on the automobile are positioned beneath the body with no protrusions beyond the bumper as is characteristic of present day hitches.

The spacing of the connector bars 43 can be laterally adjusted by means of the spacer bar 47 so as to accommodate automobiles of different widths.

During very sudden stops or in situations where the trailer brakes fail there is a tendency for an upward buckling of the entire assembly about ball connection 16. If this is not controlled, there is a danger of interference with the control of the towing vehicle or even damage to the trailer or dolly. However, any such difficulty can be avoided by mounting the wheel quite close to member 17 and fixing a plate 24 about 6 inches wide on member 17. This plate is intended as a stop plate to engage the wheel during panic stops in the manner shown in FIG. 8. Thus, when the trailer attempts to approach the rear end of the towing vehicle, the assembly commences buckling upwardly about connector 16. However, when this buckling has proceeded to the position shown in FIG. 8 the surface of the wheel is pressing hard against plate 24 and no further buckling is possible.

Various modifications and changes are contemplated and may obviously be resorted to, without departing from the spirit or scope of the invention as hereinafter defined by the appended claims.

What is claimed is:

1. A trailer dolly comprising a central frame member; a towing ball mounted on said frame member for receiving a trailer draft tongue universal coupling; a road engaging wheel assembly swivelly connected via a vertical axis beneath said frame member, said wheel assembly including a bridge member having a pair of spaced longitudinal members supporting thereon a flat plate member having fixed thereto an upwardly extending swivel axle for engaging said frame member, a pair of inclined fork members pivotally connected at their upper ends to a pivotal spacer member joining the forward ends of said spaced longitudinal bridge members, a pair of shock absorbers mounted substantially vertically between the rearward ends of said spaced longitudinal bridge members and the lower ends of said fork members and a road engaging wheel journaled in the lower ends of said fork members; and rigid hitch members extending forwardly and outwardly from said central frame member and having at their forward ends connector means for connecting to the frame of a towing vehicle by means of horizontal pivots.

2. A trailer dolly according to claim 1 wherein said flat plate is pivotally mounted on said pivotal spacer member and is supported on said longitudinal members with intervening resilient spacers.

3. A trailer dolly according to claim 2 wherein a pressure pad extending down through said central frame member frictionally engages said flat plate, thereby functioning as a wheel wobble damper.

4. A trailer dolly according to claim 3 wherein said pressure pad rides on a raised cam surface in position for straight ahead travel.

5. A trailer dolly according to claim 2 wherein an abutment plate projects downwardly from the rearward edge of said frame member to a position spaced a small distance above said flat plate.

6. A trailer dolly according to claim 1 wherein the wheel is in the form of a radial tire mounted on a rim having a diameter of at least ten inches and the shock absorber is a motorcycle type spring loaded shock.

7. A trailer dolly according to claim 1 wherein said hitch members are in the form of downwardly extending members with upwardly turned vehicle connector at the lower ends, whereby they are adapted to pass beneath the rear bumper of a towing vehicle for connecting to brackets supported by the vehicle frame.

8. A trailer dolly according to claim 7 wherein said downwardly extending members have laterally adjustable braces therebetween for adjusting the lateral spacing of the vehicle connector members.

9. A trailer dolly according to claim 1 in combination with a trailer tongue extension comprising a central extension member having at the forward end thereof a universal coupling for engaging the trailer dolly towing ball, a brace member extending downwardly and rearwardly from a rear portion of said extension, said brace having a plate extending from the bottom end thereof with a towing ball mounted on said plate to engage the trailer tongue universal coupling, a pair of braces extending rearwardly and outwardly from said extension and having fixed to their rearward ends a transverse angle member which is adapted to be fixed to the trailer tongue.

10. A combination according to claim 3 wherein a plate is mounted on said rearwardly and downwardly extending brace member adjacent said road engaging wheel and being adapted to engage the periphery of said wheel during a panic stop.

* * * * *